May 15, 1945.   J. D. KARLE   2,376,151
SUTURE SPOOL FOR SURGICAL STITCHING INSTRUMENTS
Filed Dec. 21, 1943

Inventor
John D. Karle
By John F. Heine
Attorney

Witness:
Godfrey Pecina

Patented May 15, 1945

2,376,151

UNITED STATES PATENT OFFICE 2,376,151

SUTURE SPOOL FOR SURGICAL STITCHING INSTRUMENTS

John D. Karle, Roselle Park, N. J., assignor to The Singer Manufacturing Company, Elizabeth, N. J., a corporation of New Jersey Application December 21, 1943, Serial No. 515,111

5 Claims. (Cl. 242—125)

This invention relates to suture spools for surgical stitching instruments and it has as an object to provide a spool particularly adapted to hold sutures of relatively stiff material, such, for example, as catgut.

Because of the wiry nature of catgut it heretofore has been extremely difficult to secure the inner or beginning end of a catgut suture to the spool so that rotation of the spool will cause the catgut to be wound thereon. Likewise it has been difficult to prevent the catgut from unwinding itself from the spool after it has been wound thereon.

This invention therefore has as a primary object to provide, in a suture spool, means for readily securing the beginning end of a relatively stiff suture to the hub of the spool so that rotation of the spool will cause the suture to be wound thereon and means for securing the outer or finishing end of the suture to the spool to prevent unwinding.

The above and other objects have been attained by the constructions described in the following specification and illustrated in the accompanying drawing in which—

Figure 2:
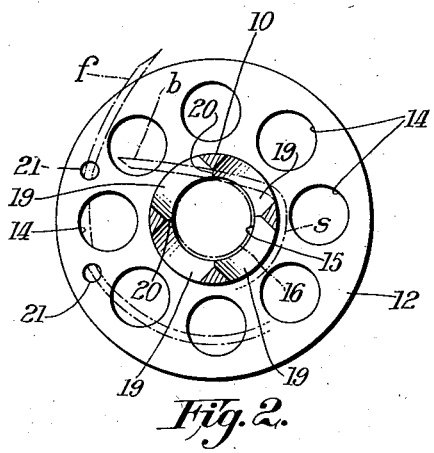
Fig. 2 is a transverse section taken on the line 2—2 of Fig. 1.

Referring more specifically to the drawing the invention is disclosed as embodied in three forms of suture spools each comprising a substantially cylindrical hub 10 to which is secured spaced circular flanges 12 and 13 each formed with a plurality of circular openings 14 which tend to reduce the weight of the spool and also permit sterilizing fluid to come into contact with the suture wrapped about the hub. Each of the hubs is formed with a central bore 15 adapted to receive a spindle 16 forming a part of a rotatable winding device comprising a flange 17 and a stud 18 carried by the flange and adapted to enter one of the openings 14, thereby to rotate the spool.

Figure 1:
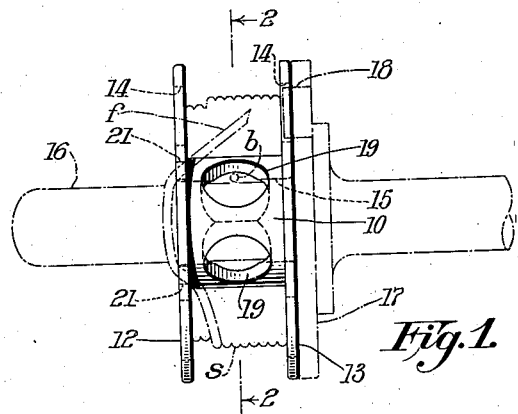
Fig. 1 is an edge view of one form of suture spool embodying the present invention, showing the spool as supported on a winding spindle which is indicated in dot-dash lines.

In the embodiment disclosed in Figs. 1 and 2 the hub 10 is formed with radial openings 19 arranged ninety degrees apart. These openings are of such diameter that they break into each other as indicated in Fig. 2 thereby affording a space 20 between the inner surface of the wall between the holes and the central bore 15 in the hub. As shown most clearly in Fig. 2, this construction permits the inner or beginning end portion b of the suture s to be inserted inwardly through one of the openings 19, thence through the space 20 and finally outwardly through an adjacent opening 19, thus locking the suture to the hub 10 and insuring that rotation of the spool will cause the suture to be wound upon the hub.

Adjacent its periphery, each spool flange 12, 13 is provided with two small openings 21 through which the outer or finishing end portion f of the suture may be laced as shown in Figs. 1 and 2 thereby to secure that end portion of the suture to the spool and prevent unwinding or spilling of the suture.

Figure 4:
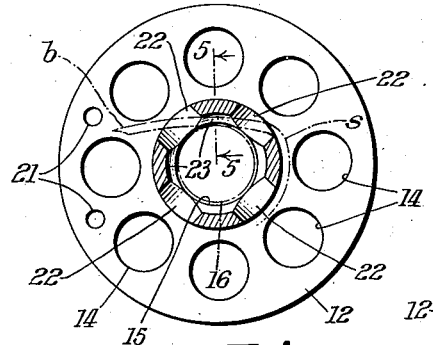
Fig. 4 is a transverse section taken on the line 4—4 of Fig. 3.
Figure 3:
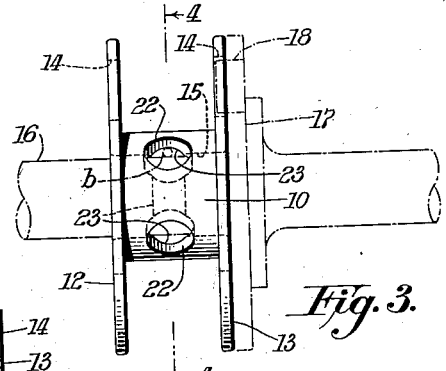
Fig. 3 is a view similar to Fig. 1 but showing another embodiment of the invention.
Figure 5:
Fig. 5 is a detail sectional view on the line 5—5 of Fig. 4.

In the construction shown in Figs. 3, 4 and 5 the same results are obtained by drilling radial holes 22 (smaller than the holes 19) in the hub of the spool and cutting a circumferential groove or channel 23 in the inner face of the hub between the holes so as to afford clearance between the wall of the groove and the winding spindle extending through the bore in the hub. In this form the beginning end b of the suture is passed inwardly through one of the holes 22, thence through the channel 23 and outwardly through the next adjacent hole 22.

Figure 7:
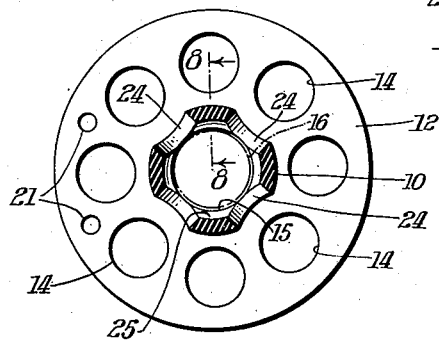
Fig. 7 is a transverse section taken on the line 7—7 of Fig. 6.
Figure 6:
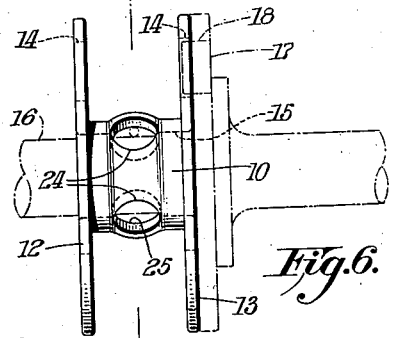
Fig. 6 is a view similar to Figs. 1 and 3 but showing still another embodiment of the invention.
Figure 8:
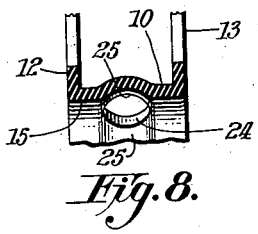
Fig. 8 is a detail section on the line 8—8 of Fig. 7.

Figs. 6, 7 and 8 illustrate the invention as embodied in a spool made of moulded material, such for example, as fiber. In this form the hub portion 10 is provided with radial holes 24, of substantially the same size as the holes 23, and with an annular groove or channel 25 connecting the holes 23, which channel is formed by a moulding operation instead of by a machining operation as in Figs. 3, 4 and 5.

After the suture has been wound on the spool and the outer or finishing end thereof has been laced through the small openings 21 in one of the flanges of the spool to prevent unwinding of the suture, the spool and the suture wound thereon may be placed in a conventional sterilizing apparatus. Thereupon the sterilizing medium is brought into contact with the wound suture not only through the outer layers thereof but also through the openings 14 in the flanges of the spool and through the bore 15 and radial openings in the hub 10, thus effecting complete sterilization of the suture in a comparatively short time.

Having thus set forth the nature of the invention, what I claim herein is:

1. A spool for a surgical suture comprising a substantially cylindrical hub and a pair of spaced flanges carried thereby, said hub being provided with an axial bore adapted to receive a winding spindle of substantially the same diameter as said bore and a plurality of radial openings extending outwardly from said bore to the periphery of said hub, the material of said hub between the inner ends of said openings being spaced outwardly from said bore sufficiently to permit the passage of a suture through said hub substantially tangential to said spindle.

2. A spool for a surgical suture comprising a substantially cylindrical hub and a pair of spaced flanges carried thereby, said hub being provided with an axial bore adapted to receive a winding spindle and a plurality of radial openings, the material of said hub between said openings being spaced outwardly from said bore sufficiently to permit the passage of a suture through said hub substantially tangential to said spindle, thereby to secure the beginning end of a suture to said hub to cause it to be rotated therewith, one of said flanges being provided, adjacent its periphery, with a pair of spaced openings through which the finishing end of a suture wound about said hub is laced to prevent unwinding of the suture.

3. A spool for a surgical suture comprising a substantially cylindrical hub and a pair of spaced flanges carried thereby, said hub being provided with an axial bore adapted to receive a winding spindle and a plurality of radial openings, said openings being so arranged that, at their inner ends, they each break into an adjacent opening whereby the material of said hub between said openings is spaced outwardly from said bore sufficiently to permit the passage of a suture through said hub substantially tangential to said spindle.

4. A spool for a surgical suture comprising a substantially cylindrical hub and a pair of spaced flanges carried thereby, said hub being provided with an axial bore adapted to receive a winding spindle, a plurality of radial openings, and an internal circumferential channel between said openings, said channel being of a depth sufficient to permit the passage of a suture therethrough substantially tangential to said spindle.

5. A moulded spool for a surgical suture comprising a hub and a pair of spaced flanges integral therewith, said hub being provided with an axial bore adapted to receive a winding spindle and a plurality of radial openings, the material of said hub being bulged outwardly to form an internal circumferential channel between said openings of a depth sufficient to permit the passage of a suture therethrough substantially tangential to said spindle.

JOHN D. KARLE.